W. T. CREED.
MEAT CUTTING MACHINE.
APPLICATION FILED JAN. 28, 1921.
1,391,616.
Patented Sept. 20, 1921.
4 SHEETS—SHEET 2.
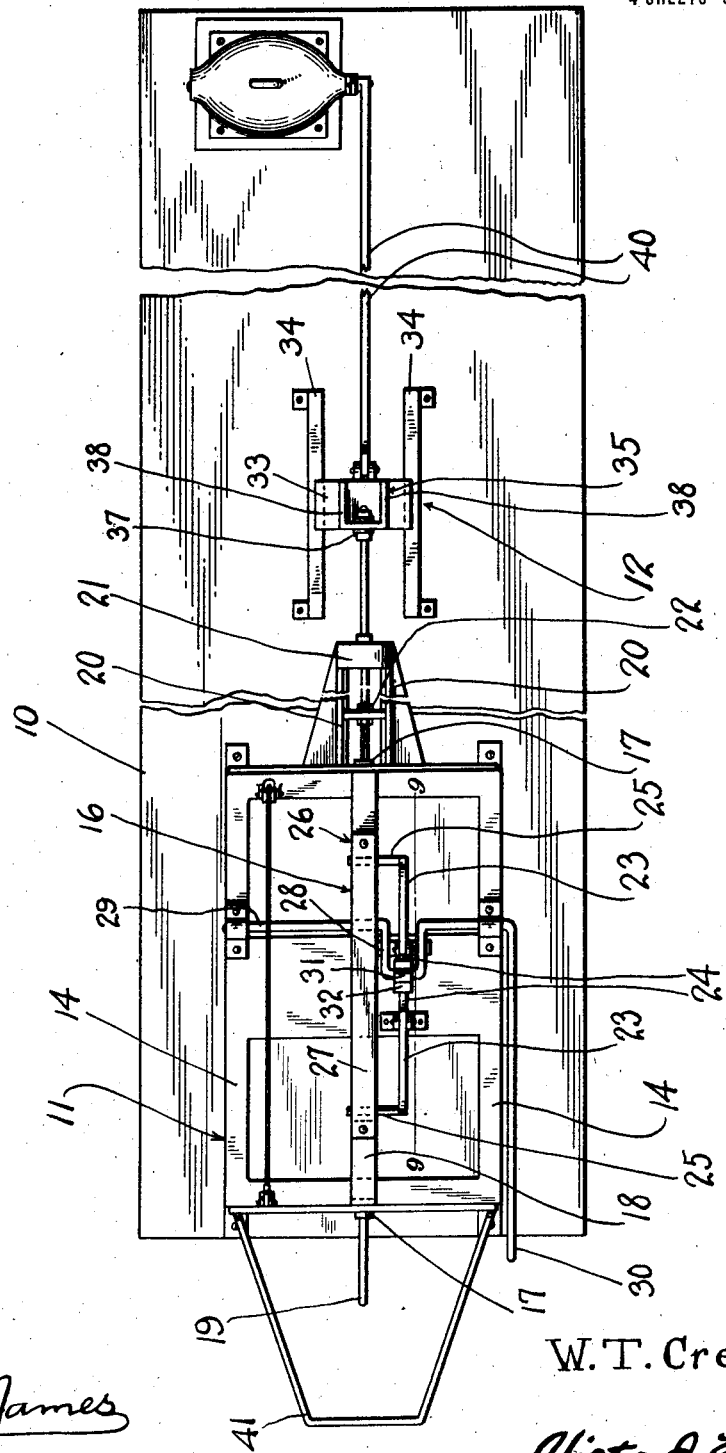
W.T. Creed
INVENTOR W. T. CREED.
MEAT CUTTING MACHINE.
APPLICATION FILED JAN. 28, 1921.
1,391,616.
Patented Sept. 20, 1921.
4 SHEETS—SHEET 3.
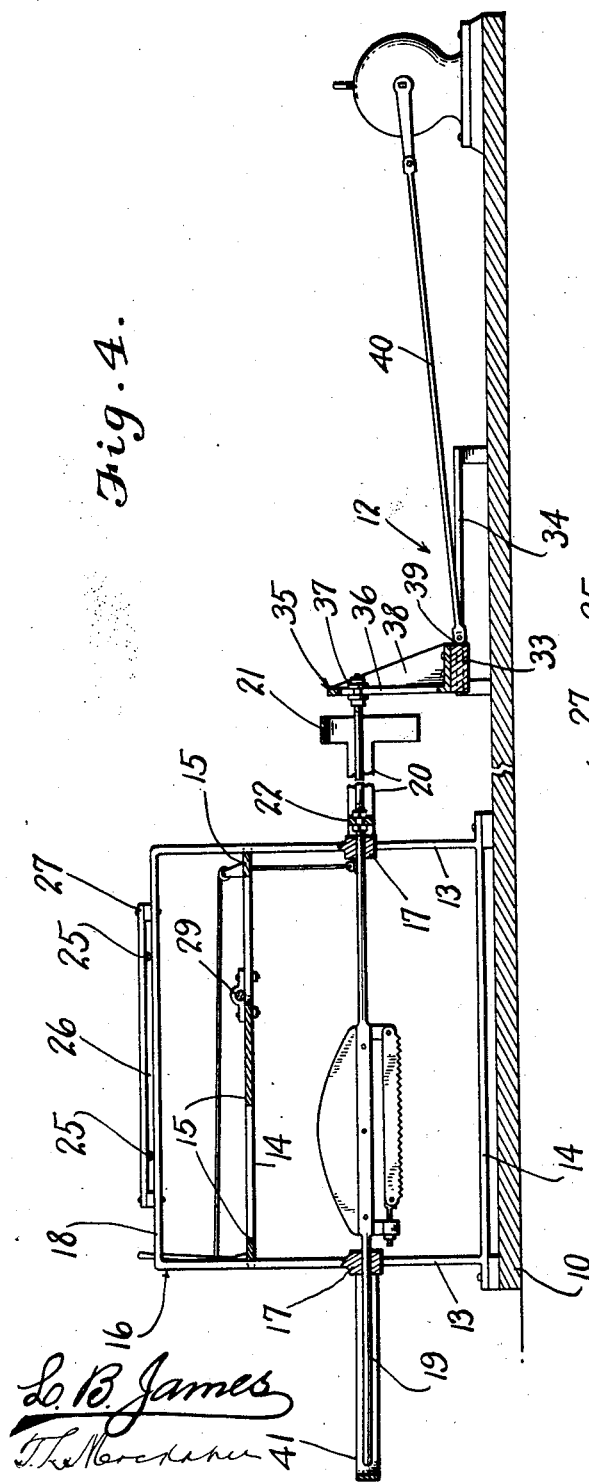
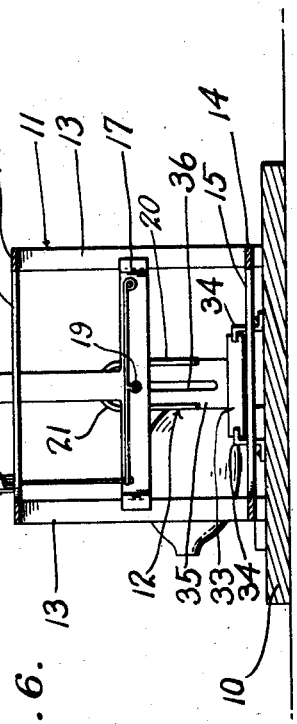
W. T. Creed
INVENTOR
BY *Victor J. Evans*
ATTORNEY
WITNESS:

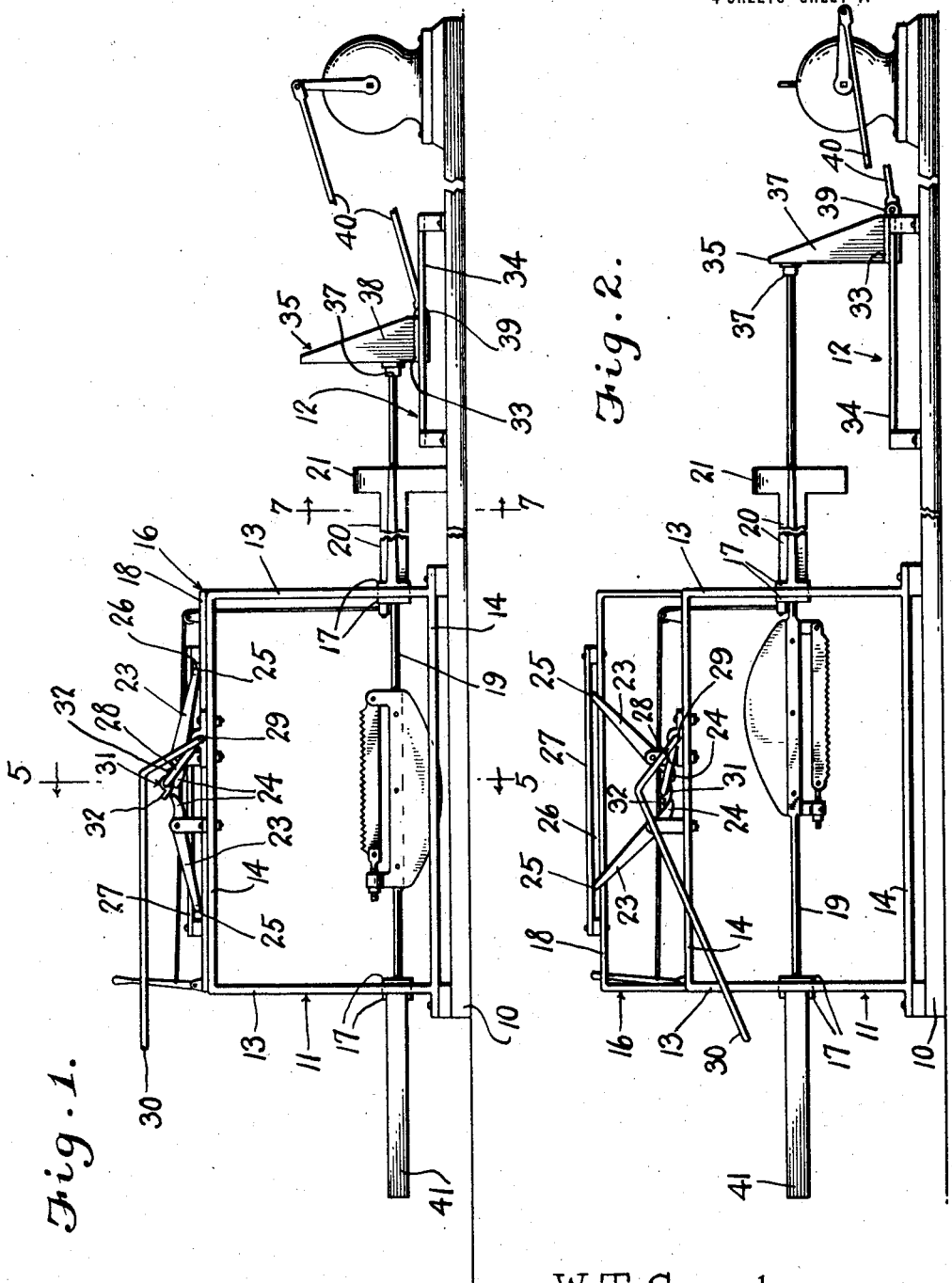

W. T. CREED.
MEAT CUTTING MACHINE.
APPLICATION FILED JAN. 28, 1921.
1,391,616.
Patented Sept. 20, 1921.
4 SHEETS—SHEET 4.
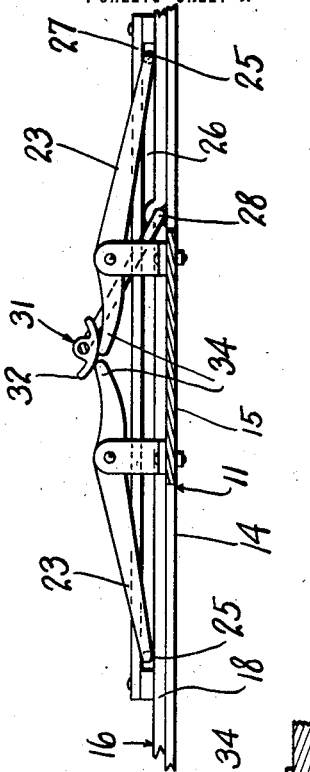
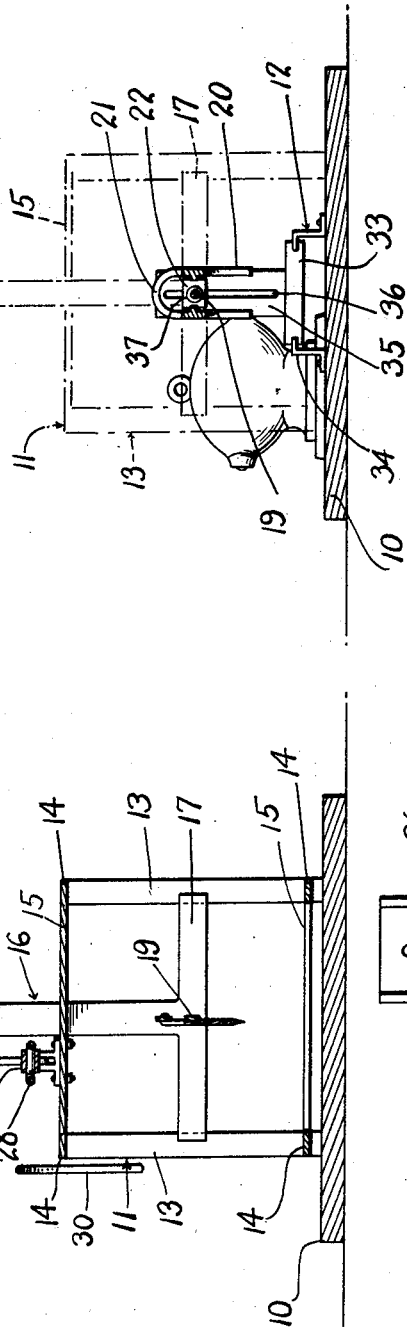
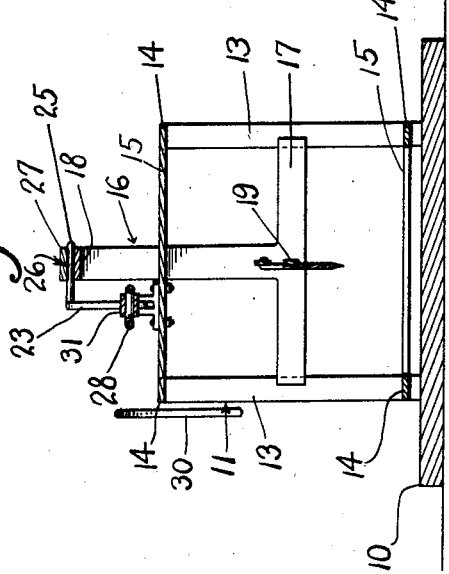
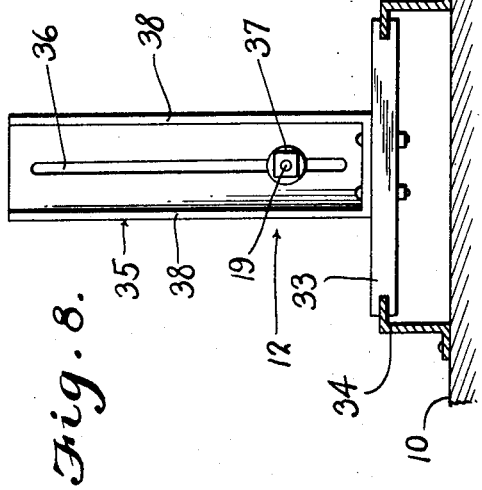
W. T. Creed
INVENTOR
BY *Victor J. Evans*
ATTORNEY
WITNESS:
*L. B. James*

UNITED STATES PATENT OFFICE.

WILLIAM T. CREED, OF IRVING, TEXAS.

MEAT-CUTTING MACHINE.

1,391,616.  Specification of Letters Patent.  Patented Sept. 20, 1921.

Application filed January 28, 1921. Serial No. 440,681.

*To all whom it may concern:*

Be it known that I, WILLIAM T. CREED, a citizen of U. S. A., residing at Irving in the county of Dallas and State of Texas, have invented new and useful Improvements in Meat-Cutting Machines, of which the following is a specification.

This invention relates to improvements in cutting machines especially designed for cutting meat and has for an object the provision of a power operated combined knife and saw, by means of which meat may be cut or sliced as desired.

Another object of the invention is the provision of a machine of the above character, in which the knife and saw are mounted upon opposite sides of a reciprocatory shaft which is capable of rotation to bring either the knife or saw into use and of being secured in such position while the machine is in operation.

Another object is the provision of means for raising the knife and saw to permit of the insertion of a piece of meat thereunder, provision being made for maintaining a sliding connection with the operating means to provide for the gradual lowering of the saw and knife during the operation.

With the above and other objects in view, the invention also includes the following novel features and details of construction, to be hereinafter more fully described, illustrated in the accompanying drawings and pointed out in the claims hereto appended.

In the drawings:—

Figure 1 is a side elevation of a cutting and sawing machine showing the knife in position for use.

Fig. 2 is a similar view with the saw arranged for use but shown in raised position.

Fig. 3 is a plan view.

Fig. 4 is a longitudinal sectional view.

Fig. 5 is a transverse section on the line 5—5 of Fig. 1.

Fig. 6 is a similar view showing the means for locking either the knife or saw in position for use.

Fig. 7 is a section on the line 7—7 of Fig. 1.

Fig. 8 is a transverse section through the pitman cross-head and showing the plan of connection between said cross-head and the operating shaft which carries the saw and knife.

Fig. 9 is an enlarged section on the line 9—9 of Fig. 3 showing the mechanism for raising the guide frame.

Referring to the drawings in detail wherein like characters of reference denote corresponding parts, the machine is shown as mounted upon a base 10 and includes a frame 11 in which the combined knife and saw is mounted for operation and a cross-head guide 12, which carries a cross-head for connection with a suitable operating means.

The frame 11 is substantially rectangular and includes standards 13 which are arranged in pairs at each end thereof and which are connected by upper and lower longitudinally arranged connecting bars 14 and upper and lower transversely arranged connecting bars 15. This provides a rigid frame upon which is mounted a vertically movable guide frame 16. This last mentioned frame includes oppositely located bearing members 17, which are slidably mounted upon the standards 13 and which are connected by a centrally arranged U-shaped bar 18, which passes over the top of the frame 11. Each of the bearing members 17 is provided with an opening for the reception of a shaft 19, the latter extending through each of the members 17, one of which (the inner member 17) having extending from its outer face parallel guides 20. These guides are connected at their outer end as indicated at 21, and the shaft 19 carries a cross-head 22 which operates in said guide to keep the shaft in proper alinement.

As previously stated, the guide frame 16 is capable of vertical movement upon the frame 11 and for this purpose there is mounted upon the last mentioned frame a pair of alined oppositely extending pivoted members 23. These members each comprise engaging ends 24, which extend toward one another and laterally extending fingers 25, the said fingers engaging and operating within a flap 26 formed by securing to and spacing from the bar 18 a short bar 27.

The pivoted members 23 are engaged by a crank 28, which is formed in a transversely arranged rock shaft 29, the latter operating in bearings carried by the upper longitudinal connecting bars 14 of the frame 11. The shaft 29 has extending therefrom an operating handle 30.

Pivotally secured to the crank 28 is a member 31, which includes oppositely extending wings 32, the latter being adapted to engage the ends 24 of the pivoted members 23, so that when the shaft 29 is rocked the fingers will be depressed. This will elevate the fingers 25 and raise the frame 16, the latter carrying with it the knife and saw.

The cross-head comprises a transversely arranged bar 33 which is slotted at each end for sliding engagement with guide bars 34, the latter being spaced above the base 10, while secured to the bar 33 is a substantially L-shaped member 35, the vertical arm of which is provided with a slot 36. The end of the shaft 19 is secured within this slot in a manner to permit of free vertical movement of the shaft as indicated at 37, so that when the guide frame 16 is elevated or lowered, operative connection between the shaft 19 and the cross-head will be maintained. The vertical arm of the member 31 is braced as indicated at 38. Extending from the cross-head is a pair of spaced ears 39, for pivotal connection with a pitman 40, the said pitman being in turn connected to any suitable operating mechanism, which may, if desired be mounted upon the base 10. The outer end of the frame 11 is provided with a guard frame 41 so as to protect the operator of the machine from the extended end of the shaft 19.

The invention is susceptible of various changes in its form, proportions and minor details of construction and the right is herein reserved to make such changes as properly fall within the scope of the appended claims.

Having described the invention what is claimed is:

1. A machine of the class described comprising a guide frame capable of vertical sliding movement, a cutting element mounted for reciprocatory movement therein, and means including a pair of pivoted fingers having a sliding engagement with the frame for adjusting the vertical position of the cutting element.

2. A machine of the class described comprising a guide frame capable of vertical sliding movement, a cutting element mounted for reciprocatory movement therein and means including a pair of pivoted fingers engageable with the frame for adjusting the latter to regulate the position of the cutting element.

3. A machine of the class described comprising a guide frame capable of vertical sliding movement, a cutting element mounted for reciprocatory movement therein and means including a pair of L-shaped pivoted arms slidably engaging the frame for adjusting the position of the cutting element.

4. A machine of the class described comprising a guide frame capable of vertical sliding movement, a cutting element mounted for reciprocatory movement therein, a pair of pivoted fingers slidably engaging the frame and a crank shaft having operative engagement with the fingers to adjust the position of the cutting element.

5. A machine of the class described comprising a guide frame capable of vertical sliding movement, a cutting element mounted for reciprocatory movement therein, means whereby the cutting element may be elevated, an operating cross head connected to the cutting element and a vertically slidable connection between the cross head and the cutting element to provide an operative engagement therebetween during the vertical movement of the guide frame.

In testimony whereof I affix my signature.

WILLIAM T. CREED.